United States Patent
Yoshimi et al.

(10) Patent No.: US 7,889,283 B2
(45) Date of Patent: Feb. 15, 2011

(54) LIQUID CRYSTAL DISPLAY DEVICE APPRECIATING ROOM

(75) Inventors: Hiroyuki Yoshimi, Ibaraki (JP); Takeharu Kitagawa, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 78 days.

(21) Appl. No.: 12/063,903

(22) PCT Filed: Apr. 5, 2007

(86) PCT No.: PCT/JP2007/057644
§ 371 (c)(1), (2), (4) Date: Feb. 15, 2008

(87) PCT Pub. No.: WO2007/138787
PCT Pub. Date: Dec. 6, 2007

(65) Prior Publication Data
US 2009/0201435 A1    Aug. 13, 2009

(30) Foreign Application Priority Data
May 26, 2006 (JP) ............................. 2006-146553
Aug. 11, 2006 (JP) ............................. 2006-219121

(51) Int. Cl.
*G02F 1/13* (2006.01)
(52) U.S. Cl. ................................ 349/1; 349/61; 349/98
(58) Field of Classification Search ...................... 349/1, 349/61, 98
See application file for complete search history.

(56) References Cited

U.S. PATENT DOCUMENTS

| 6,020,945 A * | 2/2000 | Sawai et al. ................. 349/119 |
| 2005/0057701 A1* | 3/2005 | Weiss ........................... 349/10 |
| 2005/0152031 A1* | 7/2005 | Umeya ........................ 359/449 |

FOREIGN PATENT DOCUMENTS

| JP | 05-225806 A | 9/1993 |
| JP | 10-186136 A | 7/1998 |

OTHER PUBLICATIONS

International Search Report of PCT/JP2007/057644, date of mailing Jun. 5, 2007.

* cited by examiner

*Primary Examiner*—David Nelms
*Assistant Examiner*—Nathanael R Briggs
(74) *Attorney, Agent, or Firm*—Westerman, Hattori, Daniels & Adrian, LLP

(57) ABSTRACT

Provided is a liquid crystal display device appreciating room making it possible to prevent glare or external-image-projection on the basis of external light so that persons can watch the screen of a liquid crystal display device satisfactorily. The appreciating room comprises a room, a liquid crystal display device arranged inside the room and having a liquid crystal panel 2, and a light source which lightens the inside of the room, wherein a ¼ wavelength plate 6 is arranged on the front surface side of a viewing-side polarizer 3 of the liquid crystal panel 2, the ¼ wavelength plate 6 is arranged to set the angle θ of the slow axis direction X thereof to 45±5° or 135±5° from the absorptive axis direction A of the viewing-side polarizer toward the counterclockwise direction when the ¼ wavelength plate is seen from the viewing-side, and light inside the room is any one of left-handed circularly polarized light and right-handed circularly polarized light.

8 Claims, 5 Drawing Sheets

LIQUID CRYSTAL DISPLAY DEVICE APPRECIATING ROOM

FIELD OF THE INVENTION

The present invention relates to a liquid crystal display device appreciating room making it possible to prevent glare on the display surface of a liquid crystal display device, or reflection inside the device.

DESCRIPTION OF THE RELATED ART

Liquid crystal display devices are widely used in notebook-size personal computers, mobile phones, televisions, large-sized display devices for home theater systems, and other articles. In recent years, liquid crystal display devices have been frequently used in relatively large-sized televisions having a screen 30 inches or more in size.

The liquid crystal panel of such liquid crystal display devices is generally equipped with at least a backside polarizer, a liquid crystal cell wherein a liquid crystal material is injected into a gap between a pair of liquid crystal cell substrates, and a viewing-side polarizer, which are arranged in this order from the side of a back light.

Incidentally, when a liquid crystal display device is appreciated in a bright environment, external light such as a light from a lighting apparatus or sunlight is radiated onto the surface of its liquid crystal panel and then reflected to cause a problem that glare or external-image-projection is generated on the screen.

In order to prevent the above-mentioned glare or external-image-projection, the surface of the liquid crystal panel is generally subjected to an antiglare treatment, which may be referred to as a light diffusing treatment, a glare inhibiting treatment, or the like. However, only by the antiglare treatment, the glare or external-image-projection on the surface of the liquid crystal panel cannot be sufficiently prevented. Specifically, in some cases, external light radiated on the surface of a liquid crystal panel passes through the viewing-side polarizer and goes onto the liquid crystal cell substrates or the like, and then the light is reflected so that the light is again emitted out from the surface of the liquid crystal panel. Only by the antiglare treatment, the following cannot be prevented: after the external light permeates through the inside of the liquid crystal cell, the light is reflected and then emitted out.

Meanwhile, as a method of a preventing the glare phenomenon in a monitor used in a computer, a method of calculating the intensity of light projected on its screen by an operating unit built in the computer, and then adjusting the brightness of the lighting apparatus on the basis of the calculated light intensity is known (Japanese Unexamined Patent Application Publication No. 10-12010). Also a method of rotating the screen of a television into a position where the projection of external light cannot be seen by a watcher of the television by means of a computer system having an external light direction detecting unit and an external light projection judging unit is known (Japanese Unexamined Patent Application Publication No. 8-223441).

SUMMARY OF THE INVENTION

However, according to the method of Japanese Unexamined Patent Application Publication No. JP-A-10-12010, it is necessary to maintain the brightness of the inside of the room to some degree; accordingly, a limit is generated into the adjustment of the brightness of the lighting apparatus. Thus, it is restrictive to prevent glare on the screen of a liquid crystal panel. As a result, a sufficient advantage cannot be expected. According to the method of Japanese Unexamined Patent Application Publication No. 8-223441, a small advantage can be expected when only one person watches the television. However, when plural persons watch the television at the same time, the advantage of preventing glare for all of the persons cannot be expected.

An object of the present invention is to provide a liquid crystal display device appreciating room making it possible to prevent glare or external-image-projection on the basis of external light so that persons can watch the screen of a liquid crystal display device satisfactorily, and a method for appreciating a liquid crystal display device.

The present invention provides a liquid crystal display device appreciating room, comprising a room, a liquid crystal display device arranged inside the room and having a liquid crystal panel, and a light source which lightens the inside of the room, wherein a ¼ wavelength plate is arranged on the front surface side of a viewing-side polarizer of the liquid crystal panel, the ¼ wavelength plate is arranged to set the angle of the slow axis direction thereof to 45±5° or 135±5° from the absorptive axis direction of the viewing-side polarizer toward the counterclockwise direction when the ¼ wavelength plate is seen from the viewing-side, and light inside the room is any one of left-handed circularly polarized light and right-handed circularly polarized light.

Herein, the slow axis direction of the ¼ wavelength plate means the direction of the axis along which the in-plane refractive index of the ¼ wavelength plate is maximum.

The liquid crystal display device appreciating room is a space where a watcher appreciates a liquid crystal panel screen of a liquid crystal display device. In this appreciating room, a liquid crystal display device is arranged wherein a ¼ wavelength plate is arranged on the front surface side of a viewing-side polarizer, and light inside the room is circularly polarized light. When the circularly polarized light inside the room, permeates through the ¼ wavelength plate on the front surface of the liquid crystal panel, the light is converted to linearly polarized light. The linearly polarized light, which is obtained by the conversion in the ¼ wavelength plate, is absorbed into the viewing-side polarizer. Accordingly, external light permeating through the liquid crystal panel from the front surface of the liquid crystal panel is neither passed through the viewing-side polarizer nor reflected on the front surface of the viewing-side polarizer. Thus, according to the present invention, in a state that the liquid crystal panel is lightened by the light source so as to be bright, images of the liquid crystal display device can be satisfactorily watched while glare or external-image-projection on the liquid crystal panel is certainly prevented.

Furthermore, a preferred aspect of the present invention provides the above-mentioned liquid crystal display device appreciating room wherein the front surface of the ¼ wavelength plate has fine irregularities.

A preferred aspect of the present invention provides the above-mentioned liquid crystal display device appreciating room wherein the ¼ wavelength plate has an optical characteristic of converting circularly polarized light at a wavelength of 550 nm to linearly polarized light.

Furthermore, a preferred aspect of the present invention provides the above-mentioned liquid crystal display device appreciating room wherein the light source is a lighting apparatus which emits circularly polarized light.

A preferred aspect of the present invention provides the above-mentioned liquid crystal display device appreciating room wherein the lighting apparatus comprises a light emitting unit and an optical member which transmits any one of left-handed circularly polarized light and right-handed circularly polarized light out of natural light emitted from the light emitting unit.

Furthermore, a preferred aspect of the present invention provides the above-mentioned liquid crystal display device appreciating room wherein the light source corresponds to natural light outside the room which enter the inside of the room from an opening in the room, and an optical member which transmits any one of left-handed circularly polarized light and right-handed circularly polarized light out of natural light outside the room is arranged to the opening in the room.

A preferred aspect of the present invention provides the above-mentioned liquid crystal display device appreciating room wherein the optical member has a film exhibiting a cholesteric phase.

The room is preferably a room in a building or a vehicle.

DETAILED DESCRIPTION OF THE PREFERRED EMBODIMENTS

With reference to the attached drawings, the present invention will be specifically described hereinafter.

Figure 1:
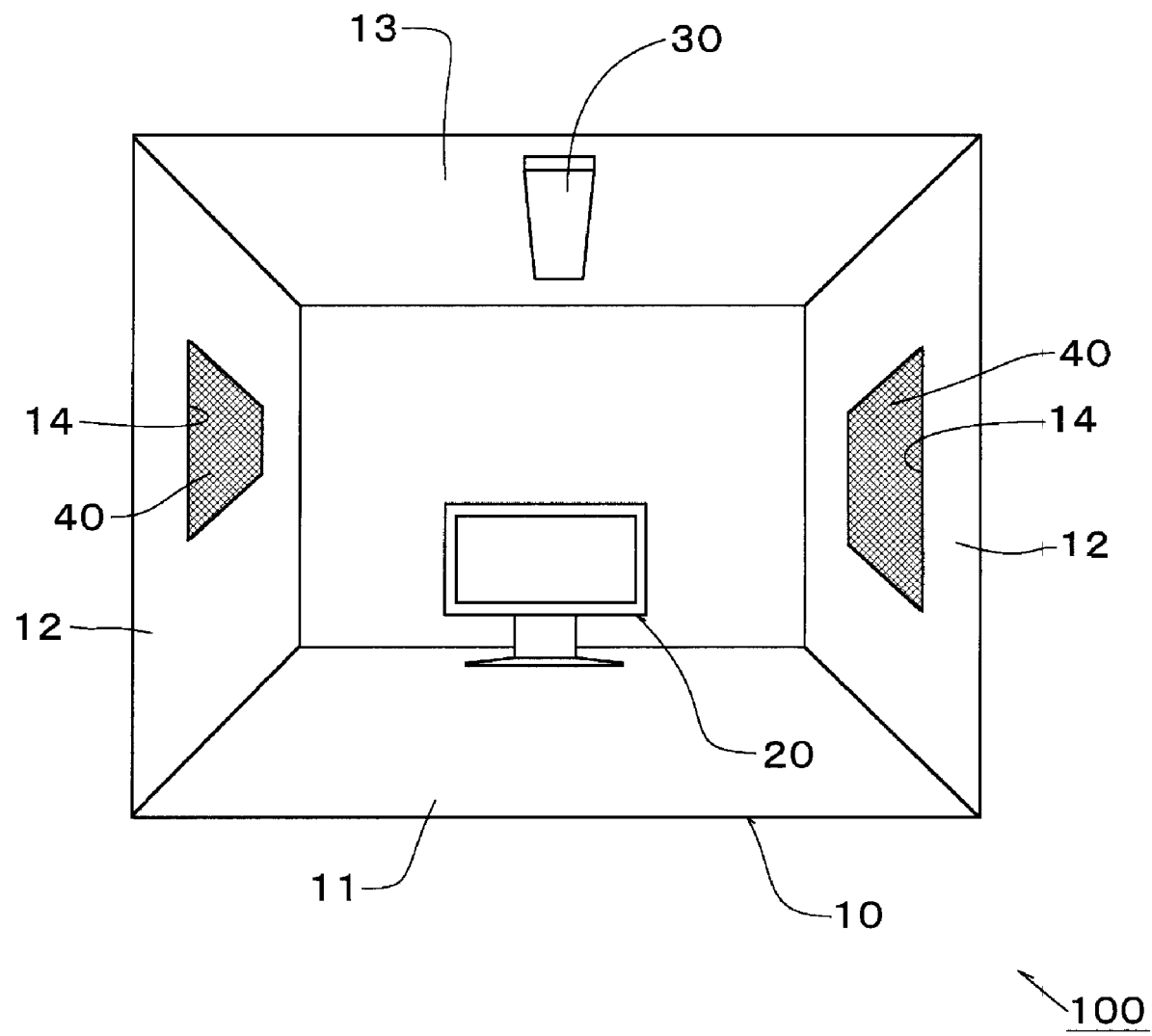
FIG. 1 is a schematic view illustrating an embodiment of the liquid crystal display device appreciating room of the present invention.

FIG. 1 is a reference view which schematically illustrates a liquid crystal display device appreciating room 100 of the present invention arranged in a building.

The liquid crystal display device appreciating room 100, which may be referred to merely as the "appreciating room" hereinafter, has a room 10 having therein a space, a liquid crystal display device 20 arranged in the space, and a light source which lightens the inside of the room.

The space of the room 10 is a space in which one or more persons watch the liquid crystal display device. The room may be, for example, a room in a building. The room 10 in the building is composed of, for example, a floor plane 11, wall planes 12 and a ceiling plane 13, which are structures. Openings (windows) 14 for taking in light outside the room (i.e., outdoor light) are made in portions of the wall planes 12 (and/or the ceiling plane 13). The openings 14 may be open to the outside. In general, however, a piece of transparent glass is fitted to each of the openings 14. Outdoor light can enter the room through the openings 14. The outdoor light is light which enters the inside of the room out of light having a light source outside the room, and corresponds to a light source which lightens the inside of the room. This light source is, for example, a lighting apparatus that is present outside the room, or sun. The lighting apparatus may be a known lighting apparatus, examples of which include discharge lamps such as a fluorescent lamp, incandescent bodies such as an incandescent lamp and a halogen lamp; and fuel lamps such as a gas lamp.

Besides the outdoor light, a lighting apparatus 30 is set, as a light source which lightens the inside of the room, in the room. The lighting apparatus 30 inside the room is not particularly limited, and may be any fixed lighting apparatus, which is fixed onto the ceiling plane 13 or the wall planes 12, or any movable lighting apparatus such as a floor lamp, which is put on the floor plane 11. The kind of the lighting apparatus inside the room is not particularly limited; thus, the lighting apparatus may be, for example, a discharge lamp, an incandescent body, or a fuel lamp as exemplified above.

The room is not limited to a room in a building as described above as long as the room has therein a space in which one or more persons can watch the liquid crystal display device. Thus, the present invention can be applied to, for example, a room in a vehicle, which is not particularly illustrated. Examples of the vehicle may be an automobile, an electric railcar (train), an airplane or any other vehicle.

The room of an automobile is a space in which a driver and optional one or more boarders rise, and usually includes a driver's cage and boarders' cage, in which window glass pieces such as a front glass piece and side glass pieces are fitted into openings (windows or the like) in the automobile. In the room of the automobile, a room light which lightens the inside of the room is set.

The room of an electric railcar or the room of an airplane is a space in which boarders rise, and is a guest room wherein window glass pieces are fitted into openings (windows) in the body of the railcar or the airplane. In the room of the electric railcar or the airplane, a room light which lightens the inside of the room is set in the same manner as described above.

In company with the popularization of liquid crystal display devices in recent years, a liquid crystal display device mounted in a car navigation system or the like is arranged inside the room of an automobile. In the room in of an electric railcar or the room of an airplane also, a liquid crystal display device is arranged in order to cause boarders to watch advertisements, cinema programs or the like.

The light emitted from the light source which lightens the inside of the room is rendered circularly polarized light.

In general, sunlight or light emitted from a lighting apparatus such as an incandescent lamp is natural light (vibration directions of the light are distributed to all directions); therefore, these lights are not made into a circularly polarized light state if no processing is applied to the light. In order to render natural light emitted from these light sources circularly polarized light in the present invention, an optical member for taking out the circularly polarized light from the natural light is arranged.

This optical member has an optical characteristic that any one of left-handed circularly polarized light and right-handed circularly polarized light out of natural light is transmitted. The optical member is arranged inside the room in order to convert the outdoor light entering the inside of the room to circularly polarized light. As illustrated in FIG. 1, in the case of, for example, the room 10 having the openings 14 through which outdoor light enters the room 10, an optical member 40 (illustrated by half tone dot meshing) is arranged to cover each of the openings 14. For example, the optical member (for example, a film exhibiting a cholesteric phase) is stuck onto the transparent glass piece fitted in each of the openings 14. When blinds, curtains or other members that have translucency are formed to open and close the openings 14, the optical member may be stuck onto each of the blinds, the curtains or the other members. When the optical members are arranged to the openings 14, outdoor light entering the inside of the room through the openings 14 turns substantially only to circularly polarized light.

In the case of a room in a vehicle, which is not illustrated, the optical members are stuck onto window glass pieces of an automobile, an electric railcar, an airplane or the like. A glass piece through which circularly polarized light can be taken out may be used as a window glass piece of an automobile, an electric railcar, an airplane or the like. Outdoor light (natural light) entering the inside of the room in the vehicle through this window glass piece turns substantially only to circularly polarized light.

Figure 2:
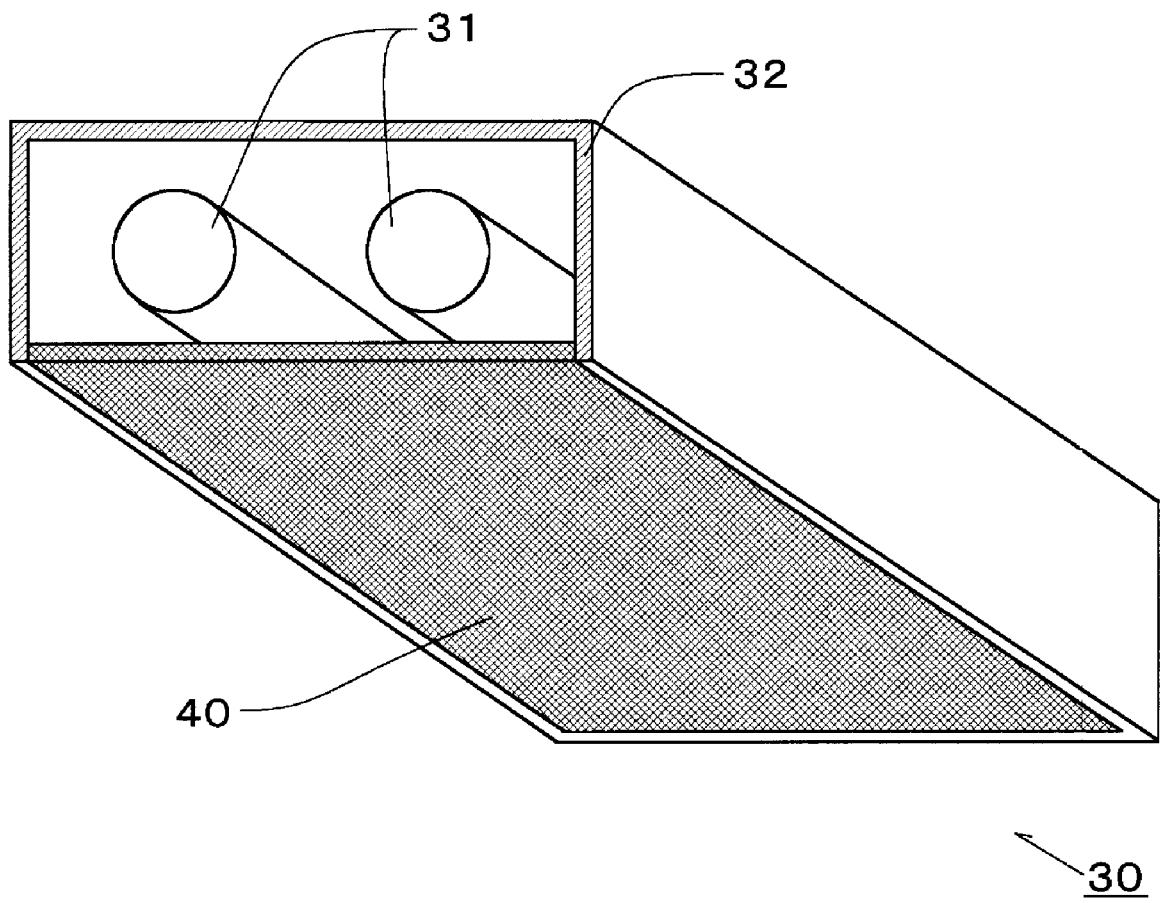
FIG. 2 is a perspective view illustrating the external form of an embodiment of a lighting apparatus having an optical member, and a partial cross section of the embodiment.

In the same manner, the lighting apparatus in the room is also arranged an optical member having an optical characteristic that any one of left-handed and right-handed circularly polarized light out of natural light is transmitted. This optical member is arranged to cover the light emitting unit of the lighting apparatus. As illustrated in FIG. 2, in the case of, for example, a lighting apparatus 30 having a light emitting unit 31 such as a fluorescent lamp and a lower-side open type shade unit 32 arranged above the light emitting unit 31, an optical member 40 (illustrated by half tone dot meshing in the same manner as in FIG. 1) is fitted to the lower opening in the shade unit 32. In the case of arranging the optical member 40 to cover the light radiating region in the lighting apparatus 30 in this way, light emitted from the lighting apparatus 30 turns substantially only to circularly polarized light.

In the case of a room in a vehicle, the optical member is arranged onto a room light in the vehicle. Accordingly, light emitted from the room light in the vehicle turns substantially only to circularly polarized light.

As described above, outdoor light which enters the inside of the room and light emitted from the lighting apparatus inside the room are each rendered circularly polarized light; therefore, the circularly polarized light is radiated on the front surface of the liquid crystal display device arranged inside the room.

Each of the above-mentioned optical members is not particularly limited as long as the member has a function of taking out circularly polarized light. Thus, the member may be a liquid crystal film exhibiting a cholesteric phase.

The material which can be used to form the liquid crystal film may be a low-molecular-weight cholesteric liquid crystal or the like. From the viewpoint of realizing a low-profile liquid crystal film and others, it is preferred to use a cholesteric liquid crystal polymer as the liquid crystal film forming material. The liquid crystal film may be a single layer or a laminate made of two or more layers.

The cholesteric liquid crystal polymer is not particularly limited, and may be a known cholesteric liquid crystal polymer. Various cholesteric liquid crystal polymers may be used, examples thereof including main chain type ones and side chain type ones, wherein a conjugated, linear atomic group (mesogen) which gives liquid crystal orientation is introduced to the main chain of a polymer and side chains of a polymer, respectively.

About the liquid crystal polymer, the glass transition temperature thereof is preferably from 30 to 150° C. from the viewpoint of the handleability thereof, the orientation stability at practical temperature, and others.

Examples of the main chain type liquid crystal polymers include liquid crystal polymers each having a structure wherein a mesogen group made of a para-substituted cyclic compound or the like is bonded (such as polyester-based, polyamide-based, polycarbonate-based, and polyesterimide-based polymers). It is also allowable to use a liquid crystal polymer having a structure wherein the above-mentioned mesogen group is bonded through a spacer moiety giving flexibility.

Examples of the side chain type liquid crystal polymers include a liquid crystal polymer having a low-molecular-weight liquid crystal compound (mesogen moiety) having, as its main chain skeleton, polyacrylate, polymethacrylate, polysiloxane, polymalonate or the like and having, as its side chain, a para-substituted cyclic compound or the like; a liquid crystal polymer wherein the above-mentioned low-molecular-weight compound (mesogen moiety) is bonded, as a side chain of the main chain skeleton, through spacer moiety made of a conjugated atomic group; a nematic phase liquid crystal polymer containing a low-molecular-weight chiral agent; a liquid crystal polymer to which a chiral component is introduced; and a liquid crystal polymer wherein a nematic phase and a cholesteric phase are mixed.

About the cholesteric liquid crystal polymer, for example, even a polymer having a para-substituted cyclic compound which gives nematic orientation can be converted to a polymer having cholesteric orientation in a manner of introducing, to the former polymer, an appropriate chiral component made of a compound having asymmetrical carbon, a low-molecular-weight chiral agent, or the like, or in some other manner (Japanese Unexamined Patent Application Publication No. 55-21479, U.S. Pat. No. 5,332,522, and others). The above-mentioned para-substituted cyclic compound, which gives nematic orientation, is, for example, a para-substituted aromatic unit or para-substituted cyclochexyl ring unit of an azomethine, azo, azoxy, ester, biphenyl, phenylcyclohexane or bicyclohexane type, or some other type.

The terminal substituent at the para-position in the para-substituted cyclic compound may be an appropriate substituent, for example, a cyano, alkyl or alkoxy group.

The above-mentioned spacer moiety is preferably a moiety having flexibility. Examples of the spacer moiety include a polymethylene chain $—(CH_2)_n—$, and a polyoxymethylene chain $—(CH_2CH_2O)_m—$. The recurring number of the structural units which form the spacer moiety is appropriately decided in accordance with the chemical structure of the mesogen moiety and others. Generally, in the case of the polymethylene chain, the above-mentioned symbol n is from 0 to 20, preferably from 2 to 12. In the case of the polyoxymethylene chain, symbol m is from 0 to 10, preferably from 1 to 3.

The liquid crystal film exhibiting a cholesteric phase may be formed by a method in accordance with an orientation treatment of conventional low-molecular-weight liquid crystal.

For example, an oriented film is formed on a supporting substrate. A liquid crystal polymer is then developed thereon. Examples of the oriented film include an oriented film obtained by forming a film made of polyimide, polyvinyl alcohol, polyester, polyarylate, polyamideimide, polyetherimide or the like onto a supporting substrate, and then subjecting the resultant to a rubbing treatment with a rayon cloth or the like; an obliquely evaporated layer of $SiO_2$; and an oriented film based on a drawing treatment.

The liquid crystal polymer is heated to the glass transition temperature thereof or higher, and lower than the isotropic phase transition temperature thereof. The polymer is then cooled to a temperature lower than the glass transition temperature in the state that the liquid crystal polymer molecules undergo Grandjean alignment, thereby turning the polymer into a glass state. In this way, a solidified layer, wherein the orientation is fixed, is formed.

As the supporting substrate, an appropriate substrate may be used, examples thereof including a mono-layered or multi-layered film or a drawn film made of a synthetic resin such as triacetylcellulose, polyvinyl alcohol, polyimide, polyarylate, polyester, polycarbonate, polysulfone, polyethersulfone, amorphous polyolefin, modified acrylic polymer or epoxy resin, and a glass plate. The synthetic resin film is preferred from the viewpoint of the attainment of a decrease in the thickness of the film.

The development of the liquid crystal polymer may be performed, for example, by painting a solution wherein the liquid crystal polymer is dissolved in a solvent, into a thin layer form, onto the oriented film, and optionally subjecting the resultant to a drying treatment. The method for the painting is not particularly limited, and examples thereof include spin coating, roll coating, flow coating, printing, dip coating, cast film-forming, bar coating, and gravure printing methods.

The solvent may be, for example, methylene chloride, cyclohexanone, trichloroethylene, tetrachloroethane, N-methylpyrrolidone, or tetrahydrofuran.

The liquid crystal polymer may be developed without using any solvent. For example, a heated melt of the liquid crystal polymer, preferably a heated melt thereof in a state that the melt exhibits an isotropic phase is developed in the same manner as described above, and optionally the heated melt is further developed into a thin film while the melt temperature is kept. In this way, the developed layer is solidified.

The heating treatment for orienting the developed layer of the liquid crystal polymer may be conducted by heating the layer into a temperature range from the glass transition temperature of the liquid crystal polymer to the isotropic phase transition temperature thereof, that is, a temperature range at which the liquid crystal polymer exhibits a liquid crystal phase. The fixation of the oriented state may be attained by cooling the liquid crystal polymer to a temperature lower than the glass transition temperature. Conditions for the cooling are not particularly limited. In many cases, the heating treatment is usually conducted at 300° C. or lower; therefore, a naturally cooling manner is generally adopted.

If necessary, various additives such as a stabilizer, a plasticizer or a metal may be incorporated into the cholesteric liquid crystal polymer.

The thickness of the solidified layer of the liquid crystal polymer formed on the supporting substrate is preferably from 0.5 to 50 μm, more preferably from 1 to 30 μm, in particular preferably from 2 to 10 μm in order to prevent a disturbance of the orientation or a fall in the transmittance. The solidified layer (liquid crystal film) of the liquid crystal polymer formed on the supporting substrate may be used in the form of the layer integrated with the supporting substrate, or may be used in the form of the layer peeled off from the supporting substrate. When the liquid crystal film is used in the form of the film integrated with the supporting substrate, the thickness of the whole containing the substrate is preferably from 2 to 500 μm, more preferably from 5 to 300 μm, in particular preferably from 10 to 200 μm.

The liquid crystal display device is equipped with a liquid crystal panel having at least a liquid crystal cell, and a polarizer arranged on each of the viewing-side and the backside of the liquid crystal cell. As long as a ¼ wavelength plate is arranged on the front surface side of the viewing-side polarizer of the liquid crystal panel, the structure of the liquid crystal display device is not particularly limited in the present invention. The liquid crystal display device may be a liquid crystal display device in any liquid crystal mode, such as a VA mode, ASV mode, IPS mode, OCB mode, TN mode or STN mode. Moreover, the present invention can be applied to liquid crystal display devices known in the prior art, examples thereof including: liquid crystal display devices wherein a liquid crystal panel is equipped with various retardation plates such as a view angle compensating plate and an appropriate optical member such as a luminance improving film; and liquid crystal display devices wherein a reflecting plate is set up on the side of a back light. The present invention may also be applied to transmission type liquid crystal display devices, wherein light is radiated from the backside of a liquid crystal panel to display images; and semi-transmission type liquid crystal display devices having both of the property of a reflection type device, wherein light is radiated from the viewing side of a liquid crystal panel and its screen is watched, and the property of the transmission type device.

The liquid crystal display device used in the present invention is preferably a liquid crystal television, a personal computer monitor, or a display device having a relatively large screen, such as an informational monitor for commercial stores.

Figure 3:
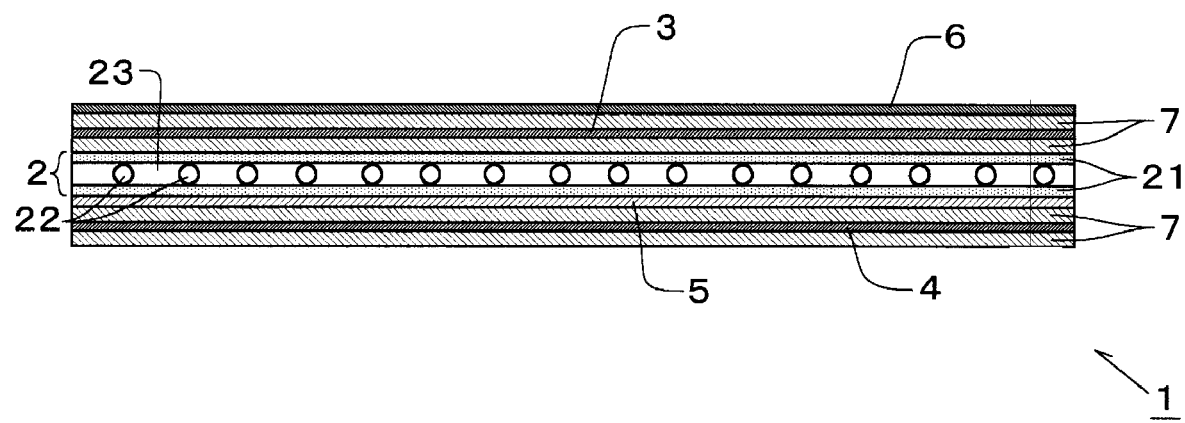
FIG. 3 is a sectional view illustrating an embodiment of a liquid crystal panel.

FIG. 3 illustrates an example of the layer structure of a liquid crystal panel. Attention should be paid to the matter that the ratio between the length, width and thickness of each of its constituting members is different from actual one for the convenience of illustration.

The front surface of the liquid crystal panel is formed into, for example, a rectangle when viewed from the front thereof. This liquid crystal panel 1 has a liquid crystal cell 2, polarizers 3 and 4 arranged on the viewing-side and the backside of the liquid crystal cell 2, respectively, an optical compensating plate 5 arranged between the liquid crystal cell 2 and the polarizer 4, and a ¼ wavelength plate 6 arranged the front surface of the viewing-side polarizer 3. The front surface of the viewing-side polarizer 3 is a surface of the polarizer farther from the liquid crystal cell 2. In the same manner, the front surface of the ¼ wavelength plate 6 is a surface of the ¼ wavelength plate 6 farther from the liquid crystal cell 2.

The liquid crystal cell 2 is equipped with, for example, a pair of liquid crystal cell substrates 21 and 21, a spacer 22 interposed between the liquid crystal cell substrates 21 and 21, and a liquid crystal material (not illustrated) injected into a liquid crystal layer 23 formed between the liquid crystal cell substrates 21 and 21. The liquid crystal cell 2 is also equipped with a color filter, electrode elements such as a TFT substrate for driving a liquid crystal material, and others, which are not particularly illustrated.

The optical compensating plate 5 is bonded to the backside (back light side) of this liquid crystal cell 2 through a pressure sensitive adhesive or the like. The optical compensating plate 5 is made of a retardation plate exhibiting a predetermined retardation.

The polarizers 3 and 4 are each sandwiched between a pair of protective films 7 and 7. The backside polarizer 4, which is protected by the protective film pair 7, is bonded to the back surface of the optical compensating plate 5 through a pressure sensitive adhesive or the like. The viewing-side polarizer 3, which is protected by the protective film pair 7, is bonded to the front surface of the liquid crystal cell 2 through a pressure sensitive adhesive or the like. The optical compensating plate 5 may be arranged between the viewing-side polarizer 3 and the liquid crystal cell 2. The optical compensating plate 5 may be arranged both between the viewing-side polarizer 3 and the liquid crystal cell 2 and between the backside polarizer 4 and the liquid crystal cell 2, respectively. The protective film 7 may be omitted as the need arises.

The ¼ wavelength plate 6 arranged on the front surface side of the viewing-side polarizer 3 is bonded to the surface of the protective film 7 through, for example, a pressure sensitive adhesive or the like.

This ¼ wavelength plate 6 is an optical member for converting circularly polarized light to linearly polarized light (the so-called retardation plate). Specifically, circularly polarized light which enter the ¼ wavelength plate 6 from the front surface of the ¼ wavelength plate 6 permeates through the ¼ wavelength plate 6, so that circularly polarized the light is converted to linearly polarized light so as to be emitted out from the back surface of the ¼ wavelength plate 6.

Figure 4A:
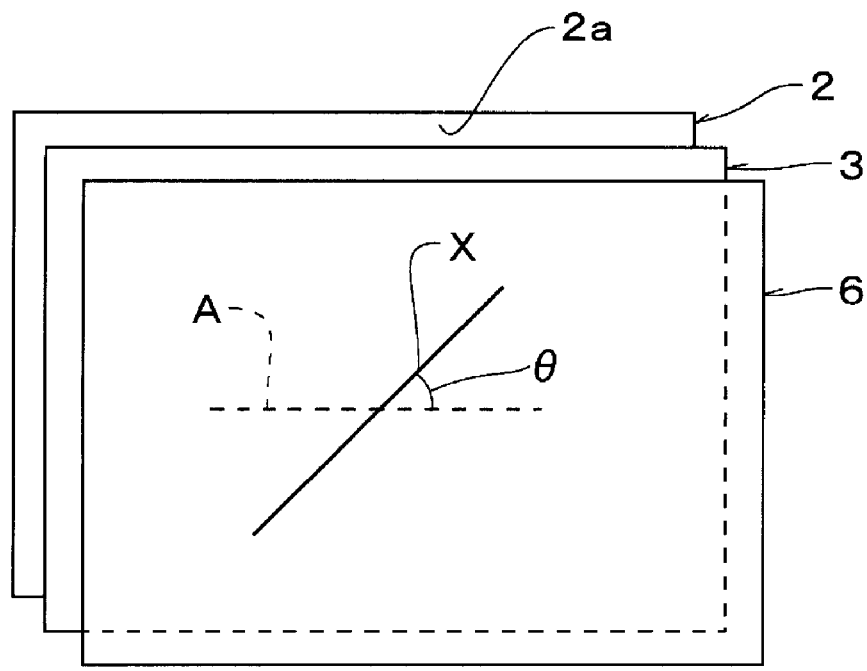
FIGS. 4A and 4B are each a reference view illustrating a direction along which a viewing-side polarizer and a ¼ wavelength plate are laminated onto each other.

When light inside the above-mentioned room is left-handed circularly polarized light, the ¼ wavelength plate 6 is arranged on the front surface side of the viewing-side polarizer 3 as illustrated in FIG. 4A, so that the angle θ of the slow axis direction X of the ¼ wavelength plate 6 from the absorptive axis direction A of the viewing-side polarizer 3 is set 45±5°, preferably 45±3° toward the counterclockwise direction when the ¼ wavelength plate 6 is seen from the viewing-side.

Figure 4B:
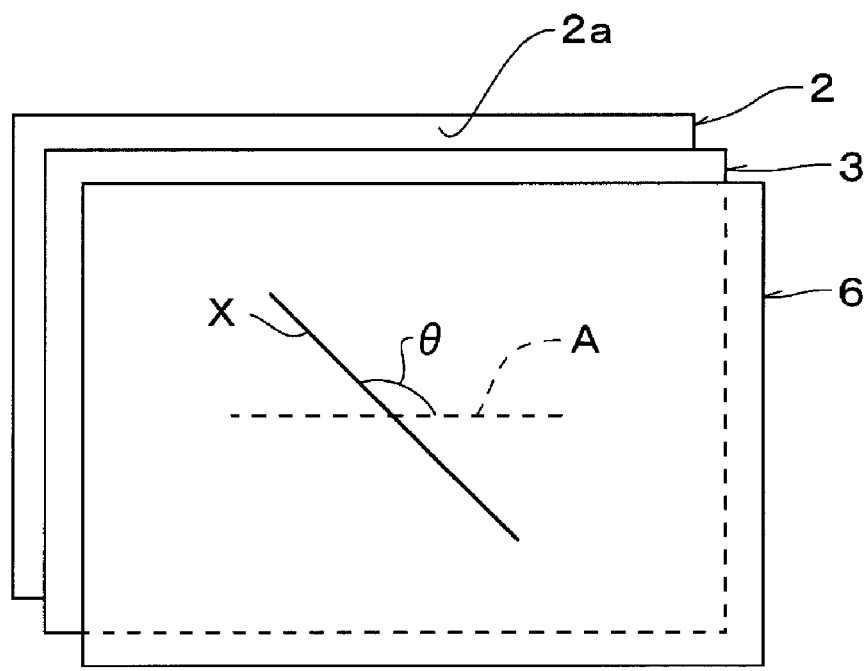

On the other hand, when light inside the above-mentioned room is right-handed circularly polarized light, the ¼ wavelength plate 6 is arranged on the front surface side of the viewing-side polarizer 3 as illustrated in FIG. 4B, so that the angle θ of the slow axis direction X of the ¼ wavelength plate 6 from the absorptive axis direction A of the viewing-side polarizer 3 is set 135±5°, preferably 135±3° toward the counterclockwise direction when the ¼ wavelength plate 6 is seen from the viewing-side.

In FIGS. 4A and 4B, reference numbers 2 and 2a represent the liquid crystal cell and the viewing-side surface of the liquid crystal cell, respectively.

The material for forming the ¼ wavelength plate is not particularly limited, and examples thereof include polyolefins (such as polyethylene, polypropylene, and polynorbornene), amorphous polyolefin, polyimide, polyamideimide, polyamide, polyetherimide, polyetheretherketone, polyetherketone, polyketonesulfide, polyethersulfone, polysulfone, polyphenylenesulfide, polyphenyleneoxide, polyethylene terephthalate, polybutylene terephthalate, polyethylene naphthalate, polyacetal, polycarbonate, polyarylate, polymethyl methacrylate, polymethacrylate, polyacrylate, polystyrene, polypropylene, polynorbornene, cellulose polymers (such as triacetylcellulose (TAC)), epoxy resin, phenol resin, norbornene resin, polyester resin, polyethersulfone resin, polysulfone resin, polycarbonate resin, polyamide resin, polyimide resin, polyolefin resin, acrylic resin, polynorbornene resin, polyarylate resin, polystyrene resin, polyvinyl alcohol resin, polyvinyl chloride resin, polyvinylidene chloride resin, and polyacrylic resin; and mixtures thereof. One or more of these materials are formed into a film, and the film is then subjected to a drawing treatment or the like, thereby adjusting the thickness appropriately. In such a way, the ¼ wavelength plate, which exhibits a retardation of ¼λ, can be yielded.

About the ¼ wavelength plate in the present invention, the refractive index ellipsoid thereof preferably satisfies the following relationship: nx>ny>nz or nx>nz>ny wherein the refractive index in the in-plane slow axis direction is represented by nx, the refractive index in the in-plane fast axis direction is represented by ny, and the refractive index in the thickness direction is represented by nz. When the ¼ wavelength plate has this relationship, the liquid crystal display device can be prevented from being colored so that a neutral visual property can be obtained.

About the ¼ wavelength plate in the present invention, the in-pane retardation (Δnd) at 23° C. (the same temperature condition is applied to any corresponding case in the following description) is preferably from 60 to 180 nm, more preferably from 80 to 160 nm, most preferably from 100 to 140 nm at a wavelength of 550 nm.

The ¼ wavelength plate is preferably a ¼ wavelength plate having such a wavelength dispersion property that the in-plane retardation becomes smaller toward a shorter wavelength and becomes larger toward a longer wavelength at least in the wavelength range of 400 to 700 nm (this wavelength dispersion property being called reverse wavelength dispersion property in some cases).

The ¼ wavelength plate preferably has an optical characteristic of converting circularly polarized light at least in the wavelength range of 400 to 700 nm to linearly polarized light.

Specifically, the ¼ wavelength plate is preferably one wherein the in-plane retardation Re (λ) at least in the wavelength range of 400 to 700 nm satisfies the following expression: ¼×λ (nm)×0.8≦Re (λ)≦¼×λ (nm)×1.2.

Re (λ) represents the in-plane retardation at a wavelength of λ (nm) at 23° C., and is calculated out on the basis of the expression of Re (λ)=(nx−ny)×d wherein nx represents the refractive index in the direction along which the in-plane refractive index of the ¼ wavelength plate is maximum (X axis direction), ny represents the in-plane refractive index in the direction (Y axis direction) perpendicular to the X axis direction, and d represents the thickness (nm) of the ¼ wavelength plate.

In the ¼ wavelength plate, it is preferred that fine irregularities are formed in its front surface. In the ¼ wavelength plate wherein the fine irregularities are formed in the front surface, the irregularities constitute the topmost surface of the liquid crystal panel. It is allowable to form a transparent protective film or overcoat layer on the front surface of the ¼ wavelength plate as long as the transparent protective film or overcoat layer does not have a retardation which permits the phase of circularly polarized light to be changed.

As described above, when the fine irregularities are formed in the front surface of the ¼ wavelength plate, light which do not permeate through the ¼ wavelength plate, out of circularly polarized light radiated onto the ¼ wavelength plate, are diffused so that the front surface of the liquid crystal panel can be prevented from glaring and the like.

The method for forming the fine irregularities in the front surface of the ¼ wavelength plate is not particularly limited, and is, for example, a method of forming the front surface itself of the ¼ wavelength plate into irregularities, or a method of laminating a transparent layer having a fine-irregularity surface onto the front surface of the ¼ wavelength plate.

The method of forming the front surface itself of the ¼ wavelength plate into irregularities may be, for example, a method of subjecting the front surface of the ¼ wavelength plate to a roughening treatment in an appropriate manner, such as sandblasting, pressing by use of an embossing roll, or chemical etching.

The method of laminating a transparent layer having a fine-irregularity surface onto the front surface of the ¼ wavelength plate may be, for example, a method of coating a transparent resin layer independently onto the front surface of the ¼ wavelength plate, and subjecting the front surface of this transparent resin layer to a roughening treatment in an appropriate manner, such as sandblasting, pressing by use of an embossing roll, chemical etching, or transcription by use of a mold; or a method of coating a transparent resin wherein fine particles are dispersed onto the front surface of the ¼ wavelength plate, and then giving fine irregularities to the ¼ wavelength plate through this transparent resin layer.

Two or more of these fine irregularity forming methods may be combined, so as to form a layer wherein different fine irregularity surfaces are hybridized.

Out of the above-mentioned forming methods, preferred is the method of forming a transparent resin layer wherein fine particles are dispersed on the front surface of the ¼ wavelength plate from the viewpoint of the formability of the fine-irregularity surface, and others.

The method of forming a transparent resin layer wherein fine particles are dispersed will be described hereinafter.

The resin which forms the transparent resin layer is not particularly limited as long as the resin is a transparent resin which permits fine particles to be dispersed therein and can give a sufficiently strong film as the transparent resin layer.

Examples of the resin include a thermosetting resin, a thermoplastic resin, an ultraviolet curing resin, an electron beam curing resin, and a two-liquid mixing type resin. It is preferred to use, out of these resin, an ultraviolet curing resin since the transparent resin layer can be effectively formed by an ultraviolet radiating treatment.

The ultraviolet curing resin may be selected from various types, such as polyester, acrylic, urethane, amide, silicone and epoxy types, and may contain an ultraviolet curing monomer, oligomer, or polymer. In particular, a preferred example of the ultraviolet curing resin is a resin having an ultraviolet polymerizing functional group, in particular, a resin containing an acrylic monomer or oligomer having such groups in a number of 2 or more, preferably 3 to 6.

Into the ultraviolet curing resin, an ultraviolet polymerization initiator is incorporated. In the formation of the transparent resin layer, additives such as a leveling agent, a thixotropic agent, and an antistatic agent may be incorporated into the transparent resin layer. In the case that the thixotropic agent (such as silica or mica having a particle size of 0.1 µm or less) is incorporated into the transparent resin layer when the layer is formed, a fine irregularity structure based on protruded particles can easily be formed in the surface of the transparent resin layer.

The fine particles may be appropriately selected from various metal oxides, glass, synthetic resins, and other transparent substances. Examples of the fine particles include silica, alumina, titania, zirconia, calcium oxide, tin oxide, indium oxide, cadmium oxide, antimony oxide and other inorganic fine particles (the inorganic fine particles may be electroconductive fine particles); and crosslinked or uncrosslinked organic fine particles made of a polymer selected from various polymers such as polymethyl methacrylate, polystyrene, polyurethane, acryl-styrene copolymer, benzoguanamine, melamine, and polycarbonate; and silicone fine particles. About these fine particle species, one or more species thereof may be appropriately selected and used. Fine particles containing at least one organic fine particle species are preferred.

The average particle diameter of the fine particles is from 1 to 10 µm, preferably from 2 to 5 µm.

The surface treatment method for the ¼ wavelength plate is not particularly limited, and may be adopted from appropriate methods. For example, the surface treatment is conducted by coating a resin (for example, a painting solution of an ultraviolet curing resin) which contains fine particles, drying the resin, and curing the resin, thereby forming a transparent resin layer having, on its surface, irregularities.

The coating solution may be coated in an appropriate manner such as fountaining, die coating, casting, spin coating, fountain metering, or gravure coating.

The haze value, the average of peak to valley distance (Sm), the centerline average roughness (Ra) and others of the fine irregularity surface of the formed transparent resin layer can be set into satisfactory ranges by adjusting appropriately the average particle diameter of the fine particles contained in the coating solution, the ratio of the particles contained in the coating solution, the thickness of the transparent resin layer, or other factors.

The ratio of the fine particles contained in the coating solution is not particularly limited. In order to restrain the glare, the fine particles are incorporated preferably in an amount of 6 to 20 parts by weight for 100 parts by weight of the resin.

The thickness of the transparent resin layer is not particularly limited, and is preferably from about 3 to 6 µm, more preferably from 4 to 5 µm.

Furthermore, a low refractive index layer having an antireflective function may be formed on the fine irregularity surface of the transparent resin layer. The material for this low refractive index layer is not particularly limited as long as the material is a material having a lower refractive index than the transparent resin layer. The method for forming the low refractive index layer is not particularly limited, and is preferably a wet coating method since the wet coating method is an easier method than vacuum evaporation method and others.

The material for this low refractive index layer is, for example, a resin material such as an ultraviolet curing acrylic resin, a hybrid material wherein inorganic fine particles such as colloidal silica are dispersed in a resin, or a sol-gel material obtained by use of a metal alkoxide, such as tetraethoxysilane or titanium tetraethoxide.

The above-exemplified material for the low refractive index material may be a polymer, or a monomer or oligomer, which is a precursor thereof.

As each of the materials, a fluorine-group-containing compound may be used to give antifouling property to the surface.

From the viewpoint of scratch or abrasion resistance, a low refractive index layer material having a large inorganic component content tends to be preferred. The sol-gel material is particularly preferred.

The fluorine-group-containing sol-gel material is, for example, a perfluoroalkylalkoxysilane. The perfluoroalkylalkoxysilane is, for example, a compound represented by the following general formula (1): $CF_3-(CF_2)_n-C_2H_4-Si(OR)_3$ wherein Rs each independently represent an alkyl group having 1 to 5 carbon atoms, and n represents an integer of 0 to 12.

Specific examples thereof include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane, and heptadecafluorodecyltriethoxysilane. Out of these, compounds wherein n is from 2 to 6 are preferred.

In the formation of the low refractive index layer, a sol wherein silica, magnesium fluoride or the like is dispersed in an alcohol solvent may be added to a solution for forming the layer. Besides, an additive such as a metal salt or a metal compound may be appropriately blended therewith. The thickness of the low refractive index is not particularly limited, and is preferably from about 0.05 to 0.3 µm, in particular preferably from 0.1 to 0.3 µm.

In the above-mentioned liquid crystal display device appreciating room, watchers can appreciate the screen of the liquid crystal panel of the liquid crystal display device satisfactorily in a bright environment.

Figure 5:
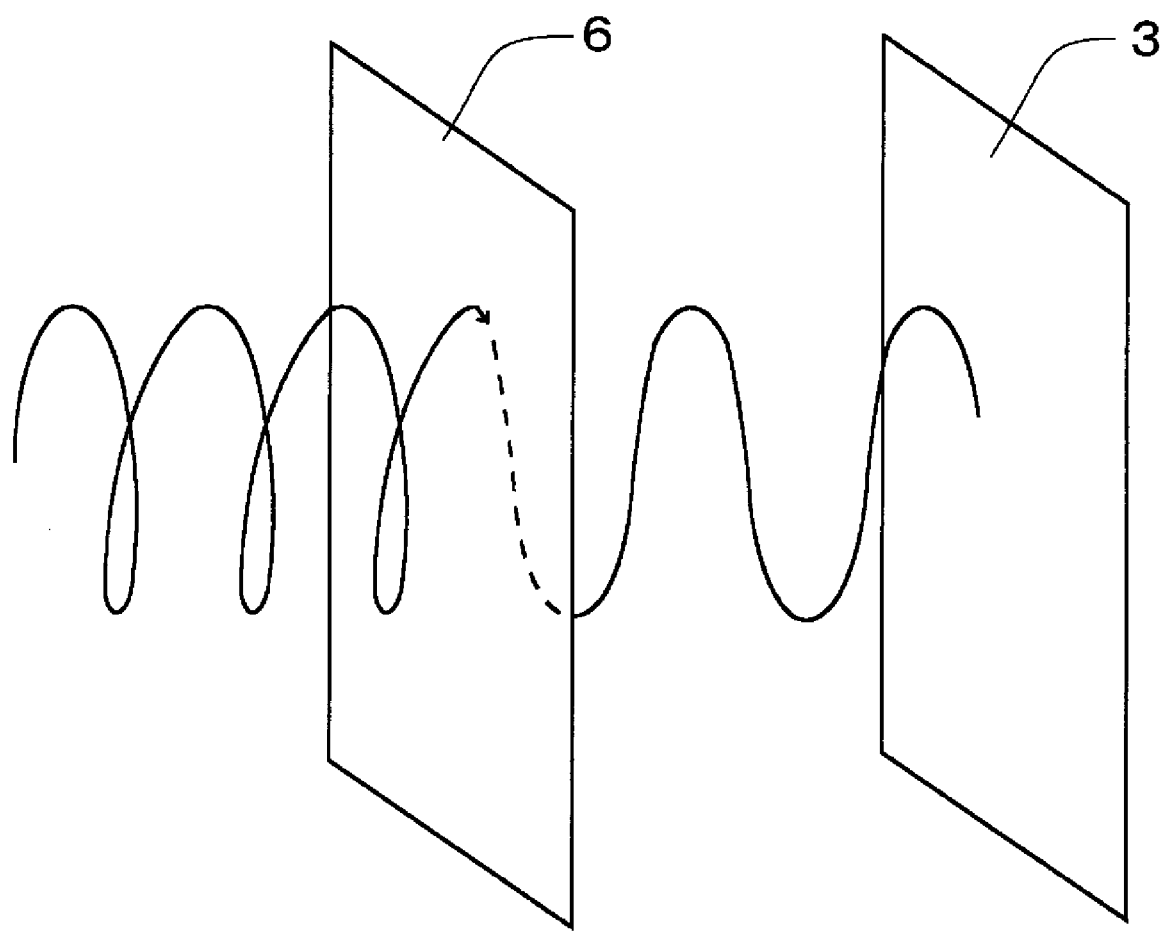
FIG. 5 is a conception diagram illustrating a state that light inside a room is absorbed in the viewing-side polarizer.

Specifically, the inside of the room is in a bright environment based on light from the lighting apparatus or outdoor light, which enters the inside through the openings. In this state, the light inside the room is being radiated onto the front surface of the liquid crystal panel of the liquid crystal display device arranged inside the room. In the appreciating room of the present invention, the ¼ wavelength plate is arranged on the viewing-side of the viewing-side polarizer of the liquid crystal panel, so that the light inside the room is turned to circularly polarized light. For this reason, as illustrated in FIG. 5, when the circularly polarized light inside the room permeates through the ¼ wavelength plate 6 on the front surface of the liquid crystal panel, the light is converted to linearly polarized light. The linearly polarized light, which is obtained by the conversion by the ¼ wavelength plate 6, is absorbed into the viewing-side polarizer 3. Accordingly, the light (external light) penetrating to the inside of the liquid crystal panel from the front surface of the liquid crystal panel is neither passed through the viewing-side polarizer nor reflected on the front surface of the viewing-side polarizer. Thus, in the appreciating room, glare or external-image-projection can be certainly prevented in such a bright state that the inside of the room is lightened by light. As a result, in the appreciating room, images of the liquid crystal display device can be satisfactorily watched. When fine irregularities are formed in the front surface of the ¼ wavelength plate, it is also possible to prevent glare or external-image-projection based on light reflected on the front surface of the ¼ wavelength plate. Thus, the present invention can provide a more effective appreciating room.

The liquid crystal display device appreciating room of the present invention can be used as, for example, a room for watching a television or a personal computer monitor in any ordinary home. The appreciating room can also be used as an exhibition selling room for various goods having a liquid crystal display device, such as a television, a personal computer monitor, and a portable video game machine. Furthermore, the appreciating room can be used as a room for a seminar, a gathering for a showing, a symposium or the like wherein a liquid crystal display device is used.

The liquid crystal display device appreciating room of the present invention can be used in a vehicle as well as a building; thus, the room can be used as a driver's cage wherein a liquid crystal display device mounted on a car navigation system or the like can be watched. Moreover, the appreciating room can be used as a guest room of an electric railcar or an airplane wherein a liquid crystal display which displays advertisements, various programs or the like can be watched.

The liquid crystal display device appreciating room and the appreciating method of the present invention, which are not limited to the above-exemplified various embodiments, can be appropriately modified or changed within the scope intended by the present invention. For example, in the above-mentioned embodiments, the ¼ wavelength plate is bonded to the front surface of the liquid crystal panel; however, a ¼ wavelength plate which can be putted on or taken off from the liquid crystal panel may be used.

What is claimed is:

1. A liquid crystal display device appreciating room, comprising:
a room,
a liquid crystal display device arranged inside the room and having a liquid crystal panel, and
a light source which lightens the inside of the room,
wherein said light source includes a light bulb and an optical member,
wherein said optical member circularly polarizes the light emitted from the light bulb,
wherein a ¼ wavelength plate is arranged on the front surface side of a viewing-side polarizer of the liquid crystal panel,
the ¼ wavelength plate is arranged to set the angle of the slow axis direction thereof to 45±5° or 135±5° from the absorptive axis direction of the viewing-side polarizer toward the counterclockwise direction when the ¼ wavelength plate is seen from the viewing-side, and
light inside the room essentially consists of left-handed circularly polarized light or right-handed circularly polarized light.

2. The liquid crystal display device appreciating room according to claim 1, wherein the front surface of the ¼ wavelength plate has fine irregularities.

3. The liquid crystal display device appreciating room according to claim 1, wherein the ¼ wavelength plate has an optical characteristic of converting circularly polarized light at a wavelength of 550 nm to linearly polarized light.

4. The liquid crystal display device appreciating room according to claim 1, wherein the light source transmits any one of left-handed circularly polarized light and right-handed circularly polarized light.

5. The liquid crystal display device appreciating room according to claim 1, further comprising:
a second light source,
a second optical member,
wherein the second light source corresponds to natural light outside the room which enter the inside of the room from an opening in the room, wherein
said second optical member, which transmits any one of left-handed circularly polarized light and right-handed circularly polarized light out of natural light outside the room, is arranged in an opening in the room.

6. The liquid crystal display device appreciating room according to claim 1, wherein the optical member has a film exhibiting a cholesteric phase.

7. The liquid crystal display device appreciating room according to claim 1, wherein the room is a room in a building.

8. The liquid crystal display device appreciating room according to claim 1, wherein the room is a room in a vehicle.

* * * * *